US008869302B2

(12) United States Patent
Tresanti

(10) Patent No.: US 8,869,302 B2
(45) Date of Patent: Oct. 21, 2014

(54) SYSTEM AND METHOD FOR MANAGING AND SHARING USERS' INFORMATION AND CONTACTS WITHIN A COMPUTER NETWORK

(76) Inventor: Tiziano Tresanti, Pomarolo (IT)

(*) Notice: Subject to any disclaimer, the term of this patent is extended or adjusted under 35 U.S.C. 154(b) by 0 days.

(21) Appl. No.: 13/503,350

(22) PCT Filed: Oct. 5, 2010

(86) PCT No.: PCT/IT2010/000415
§ 371 (c)(1),
(2), (4) Date: Jun. 7, 2012

(87) PCT Pub. No.: WO2011/048619
PCT Pub. Date: Apr. 28, 2011

(65) Prior Publication Data
US 2012/0246742 A1 Sep. 27, 2012

(30) Foreign Application Priority Data
Oct. 20, 2009 (IT) .............................. VI2009A0253

(51) Int. Cl.
H04L 29/06 (2006.01)
G06F 15/16 (2006.01)
H04L 29/08 (2006.01)

(52) U.S. Cl.
CPC .............. *G06F 15/16* (2013.01); *H04L 67/306* (2013.01)
USPC .............................. 726/28; 709/203; 713/185

(58) Field of Classification Search
CPC ......... H04W 8/18; H04L 67/306; G06F 15/16
USPC ............................................................. 726/28
See application file for complete search history.

(56) References Cited

U.S. PATENT DOCUMENTS 6,889,213 B1     5/2005  Douvikas
7,739,602 B2 *   6/2010  Feng et al. .................... 715/733
(Continued)

FOREIGN PATENT DOCUMENTS

WO         02/084521 A1    10/2002
WO      WO2008137742 A1    11/2008
WO      WO2008147564 A1    12/2008

Primary Examiner — Justin T Darrow
Assistant Examiner — Bryan Wright
(74) Attorney, Agent, or Firm — Hedman & Costigan, P.C.; James V. Costigan; Kathleen A. Costigan

(57) ABSTRACT

A system and a method for managing and sharing, within a computer network, information and contacts related to users, according to which the user (UC), on his personal profile (PF) created on the restricted access web site, can create a certain number of business cards (BV) to be booked to given categories of persons, with the information and/or data he considers to inserted into that card; in this way, the system does not allow to a third party to access user's (UC) personal profile (UC), neither in as merely curios observers, and reserves to each user (UC) places for the insertion of their information which, thus, are made accessible only to whom the user (UC) decides to send them and only during the period for which the user (UC) desires to send them. Once the user (UC) comes into contact with a person belonging to the categories to whom he has allowed the vision of the data, he can share, for each category, certain information which are however lent, for a prefixed time period, and automatically updated in real time on personal profile (PF) of then web site.

3 Claims, 4 Drawing Sheets

(56) References Cited

U.S. PATENT DOCUMENTS

| | | | |
|---|---|---|---|
| 8,295,881 B2* | 10/2012 | Elleouet et al. | 455/558 |
| 8,341,219 B1* | 12/2012 | Young | 709/204 |
| 2002/0138633 A1 | 9/2002 | Angwin | |
| 2002/0174188 A1* | 11/2002 | Clark et al. | 709/213 |
| 2005/0198031 A1 | 9/2005 | Pezaris et al. | |
| 2007/0130101 A1 | 6/2007 | Anderson | |
| 2007/0150444 A1* | 6/2007 | Chesnais et al. | 707/3 |
| 2008/0205655 A1* | 8/2008 | Wilkins et al. | 380/279 |
| 2009/0011743 A1 | 1/2009 | Johanson | |
| 2009/0216551 A1 | 8/2009 | Chen et al. | |
| 2010/0255861 A1* | 10/2010 | Raviv et al. | 455/466 |
| 2010/0274815 A1* | 10/2010 | Vanasco | 707/798 |

* cited by examiner

SYSTEM AND METHOD FOR MANAGING AND SHARING USERS' INFORMATION AND CONTACTS WITHIN A COMPUTER NETWORK

The present invention generically refers to a system and related method for managing and sharing multiple users' information and contacts within a computer network.

More in particular, the invention relates to a method for managing information and contacts and, in the specific, for managing personal data of individuals, companies, associations, suppliers and customers, so that the same are always updated and safe.

Currently, users' information, contacts and personal data usually reside on different systems, such as databases, address books, company management software, etc. and, just because of these modes of organization, they are neither updated in real time, nor manageable by means different from those ones where they reside (for example, the information on databases, address books or management software cannot be managed by personal computers, computer networks and/or mobile phones and vice versa).

The purpose of the present invention is, therefore, to overcome the drawbacks mentioned above and, in particular, to develop a system for managing and sharing users' information and contacts within a computer network, which allows to direct into a single computer support and in an integrated and protect way users' information and personal data present on e-mail client, mobile phones address books, customers and suppliers databases, social network, social engineering platforms, etc.

Other purpose of the present invention is to create a system for managing and sharing users' information and contacts within a computer network, which allows to manage, in simple way and complete privacy protection, data related to the aforesaid information and contacts, thanks to the use of special utilities designed for the different systems, which carry and provide the data on a suitable platform, through automatic conversion processes.

Another purpose of the present invention is to provide a system for managing and sharing users' information and contacts within a computer network which offers access services to data related to the information and contacts already divided by groups of potential customers, so as to carry out any targeted advertising campaigns (by means of traditional mail, e-mail, chat, telephony, SMS, MMS, etc.) defining the contents thereof and identifying the different categories of addressees in detail.

Further purpose of the invention is to indicate a method for managing and sharing data relating to several users' information and contacts within a computer network which can be implemented by means of a system for managing and sharing such as that one previously mentioned.

These and other purposes, according to the present invention, are achieved by indicating a method for managing and sharing users' information and contacts within a computer network.

Other embodiments of detail are described in the dependent claims.

Advantageously, the method and system according to the invention summarize a type of products of "old economy" kind, such as a series of directories, telephone and addresses book, with a type of system of "new economy" kind, that is "social network", comparing to which they extract the principle of human need to keep and extend the circle of the personal relationships and, at the same time, guarantee the profiles of privacy inherent the principle of information ownership.

The system according to the invention allows to perform right this management at architectural level, firstly denying a third party accesses to user's personal profile, neither as merely curious observers, and then reserving to each user (individual and/or legal person) places for the insertion of their information which, therefore, are made available only to whom the user decides to send and only during the period for which the user desires to send.

The system includes, indeed, a mode of sending information called "business cards" that is the user, on his restricted access profile, can create a certain number of business cards to be booked for given categories of individuals, with the information he considers to insert for that specific card (for example, it is possible to create business cards for the golf friends, work colleagues, family members, company shareholders, company agents, company suppliers, customers, etc.), and it is possible to determine which information to provide to each of these categories of individuals.

Once the user enters into relationship with one of the aforesaid individuals (golf friend, family member, company agent, etc.), he could share, for each category, given information which are anyway:

lent, since the user can withdraw at any time the relationship, virtually deleting the business card provided to one or more individuals of the aforesaid categories, and
automatically updated in real time on the personal profile of the platform made available by the system.

In this way, the system, which is the object of the present invention, allows to create an index of contacts and information about the user, who may decide, from time to time, to whom he refers and which information to provide; in addition, the platform of the system may share information on other software, servers, applications, services, etc., and can integrate and/or use "social network" sites.

Additional features and advantages of a system and related method for managing and sharing users' information and contacts within a computer network, according to the present invention, will be more evident from the following description, relating to an its illustrative and preferred, but not limited to, embodiment, with reference to the protection required, and the drawings attached, in which.

Figure 1:
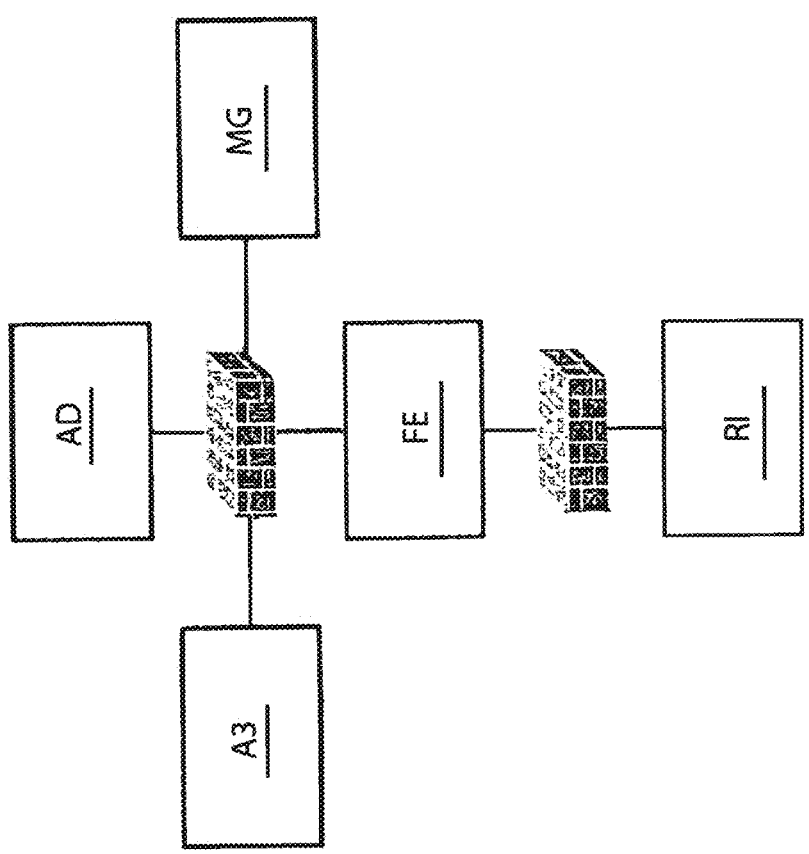
FIG. 1 shows a provisional block diagram of the architecture of the system for managing and sharing users' information and contacts within a computer network, according to the present invention.
Figure 2:
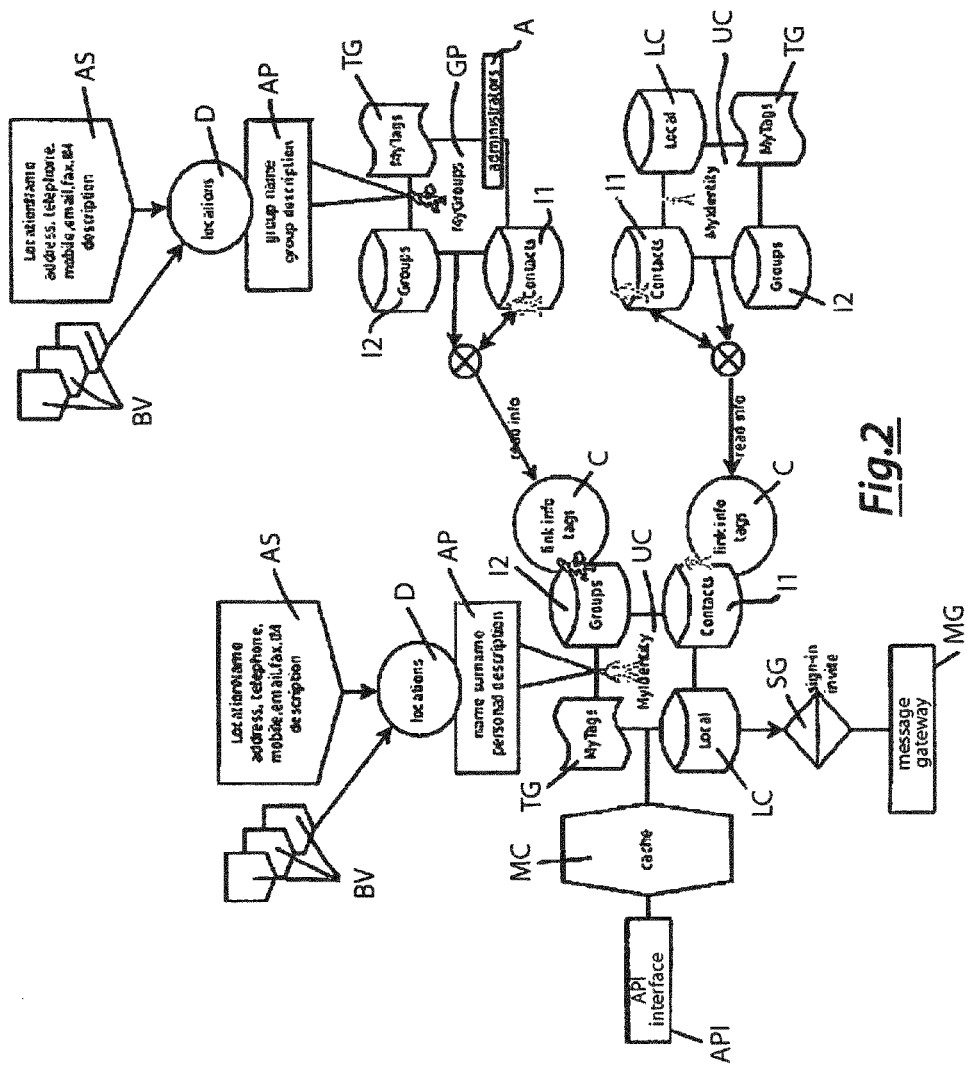
FIG. 2 shows an overall block diagram of the system for managing and sharing information and contacts, according to the invention.

With particular reference to the mentioned FIGS. 1 and 2, the system architecture is basically composed of a "Front End" FE, consisting of a web server (such as, for example, "Apache"), accessible from the Internet RI, which manages and filters users' and/or clients UC requests of the services of the system; the server FE is configured (Proxy Redirect) in order to keep some open connections in HTTP towards a database (the "Application Database" AD), while the connections are on demand towards the user UC and where it is possible the return flow is compressed and some URL are blocked or directly redirected by the "Front End" FE (for example, in case of maintenance service and/or in case of a cyber attack).

The block A3 of the system provides authentication, authorization and accounting services.

The user (client) UC can access personal data by making requests, duly authenticated through the block A3, to the database AD, through the HTTP/JSON protocol.

In particular, the database AD consists of a series of server at high reliability and redundancy configuration, in order to ensure service availability; in this way it's possible to scale down, proportionally to requests, data about user's UC information and contacts, the computing and filing power in horizontal manner, adding simple low cost servers.

The system of data filing and, more generically, the "Data Base" is properly designed and is based on a storage on file system, distributed and indexed on "yaml" format, while the "python" objects programming language guarantees its access logic and data management by means of some API available to the user UC through a layer of "cache" accelerator MC.

In practice, the "Database Application" AD receives users' requests and/or HTTP connections from the "Front End" FE and provides the data required on interfaces diversified on the basis of the context (such as, for example, PC, PDA, mobile phones, software, etc.); the managed applications particularly concern the research, registration, user's desktop, e-commerce, advertising and/or API interface towards external systems.

Finally, the "Message Gateway" block MG of the system is, in turn, a system formed by several Server Software specialized in the management electronic communications (such as e-mail, instant messaging, SMS, etc.).

The system, through the use of an on-line software which resides on the distributed architecture previously described, allows, in practice, to create relationships among different users' UC entities, such as persons, companies, groups GP, and other potential future entities, wherein the relationships present, on the basis of the context, a well-defined hierarchy depending on the exchanged information, and information are exchanged with other users UC in accordance with the qualification of the latter (for example, the information can be exchanged among persons and persons, persons and companies, companies and companies, persons and groups, etc.).

Particularly, users UC are entities suit to uniquely identify the system user (through username and password) and contextualize the profile/scheme (for example, an individual could have a profile/scheme which allows him to describe its name and surname, the company could have the scheme for describing the corporate name, the group GP could have the scheme for describing a series of participants, and so on) and the system allows the user UC to describe any aspect defining him (for example, purely personal aspects, legal aspects, fiscal aspects, addresses, hobbies, etc.).

Each user UC is able to control its own data which describe him, such as for instance those main personal ones AP (surname, name, title, company name, activity), and create a series of business cards BV containing, depending on the destination D, further data AS, such as postal address, fixed telephone number, mobile telephone number, e-mail address, fax number and/or other information.

In particular, the system preserves the privacy of the individuals and/or legal persons, as each user UC is aware of their relationships and the relationships established with others, through appropriate access interfaces I1, I2, which allow or not to carry out the connections C for reading the data and information contained in the business cards BV and, furthermore, each business card BV (which, in case of company entities and groups GP, is delegated to individuals by one or more administrators A) is different depending on user's qualifications UC and is linked to the relationship established among the entities concerned.

Each business card BV can be further modified by the user UC who holds it, so that each person manages their own data and the business cards BV remain in his personal profile (identity).

In this way, each user's UC entity can carry out an anonymous personal search based on a specific code (username), name, surname and/or various other attributes (tags, profession, etc.), can view the resources and/or attributes associated with the personal profile (IAM), which compose each business card BV, can view the list of business cards BV and complete data which compose their own business cards BV (personal data, attributes, tags, authorizations, etc.), the list of attributes of the single relationship with other users UC, the list of tags TG assigned to the contacts and VCARD, the list of business cards BV of the single contact authorized by the interfaces I1 (name, surname, title) and data which compose a business card BV of a contact authorized by the interface I1.

Entities groups GP and/or companies may have several additional features in order to ease manage of large amounts of contacts and resources (such as, for example, the numbering of all the corporate telephone exchanges or corporate e-mail addresses) and delegate the information and/or company data contained in the related business cards BV at various company employees and/or collaborators (users UC); in such a case, each user UC will find, among the personal BV business cards, even that one of the company (which he could not modify) and the company could better control the company business cards BV and eventually revoke them.

Figure 3:
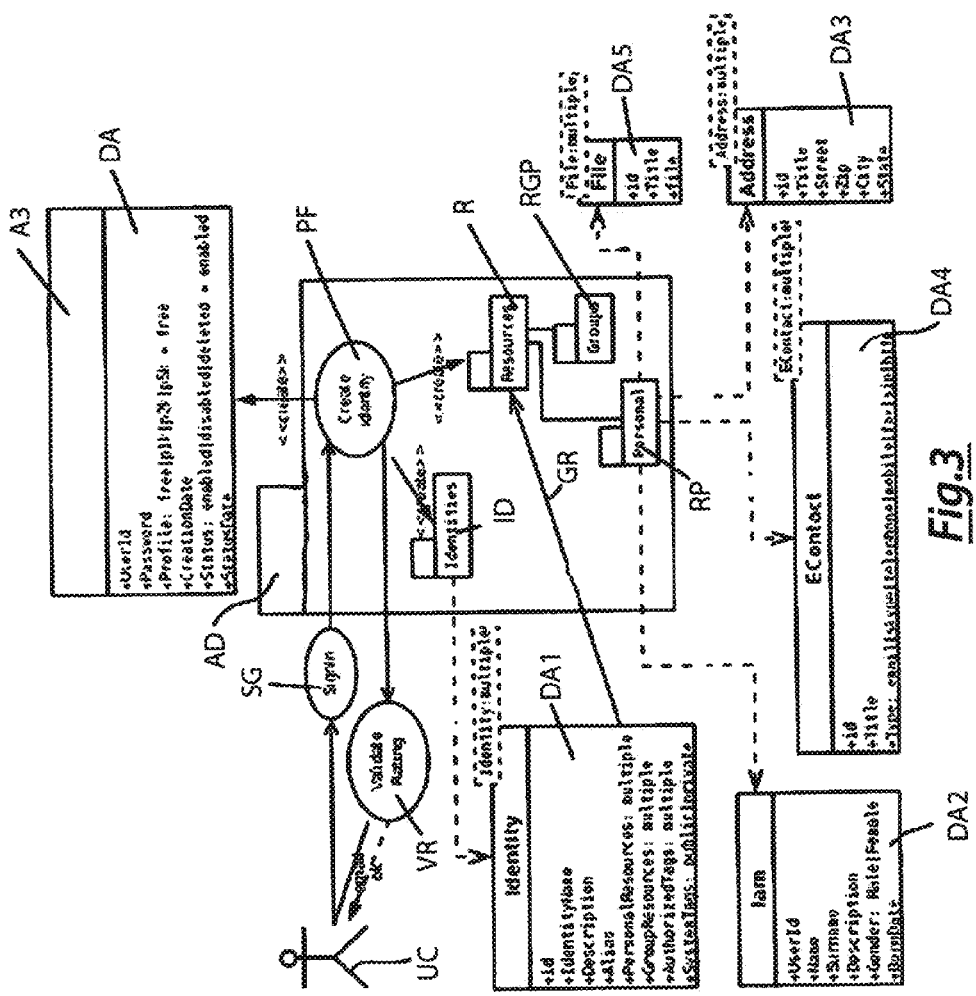
FIG. 3 shows a block diagram of a process of user's interaction within the system for managing and sharing, according to the present invention.

With particular reference to the enclosed FIGS. 3 and 4, the operation of the system and method of managing and sharing information, according to the invention, is substantially as follows.

The user UC can register himself in the system (inside a web page of a given Internet site), through the local interface LC, with a registration procedure or "Sign In" SG, through which some personal data DA and main contact references are required, in order to create the user profile PF (it has to be noted, in particular, the FIG. 3 attached for a ready check); at the end of the registration procedure SG, the user UC can validate the contacts entered through a confirmation procedure VR (which can be usually performed via e-mail) and the data contained in the object or block "Resources" R can be viewed and modified only by the owner user UC.

The object or block "Identity" ID allows to read data DA1 present in the block R through some calls or queries GR of the block R and organize them into views which can be viewed by other users according to the authorizations granted by the attributes or tags TG; views of data (relating to personal data DA2, mail data DA3, telephone and/or e-mail DA4 e/o file DA5) can be sorted and structured into by means of personal resources RP or group RGP.

Figure 4:
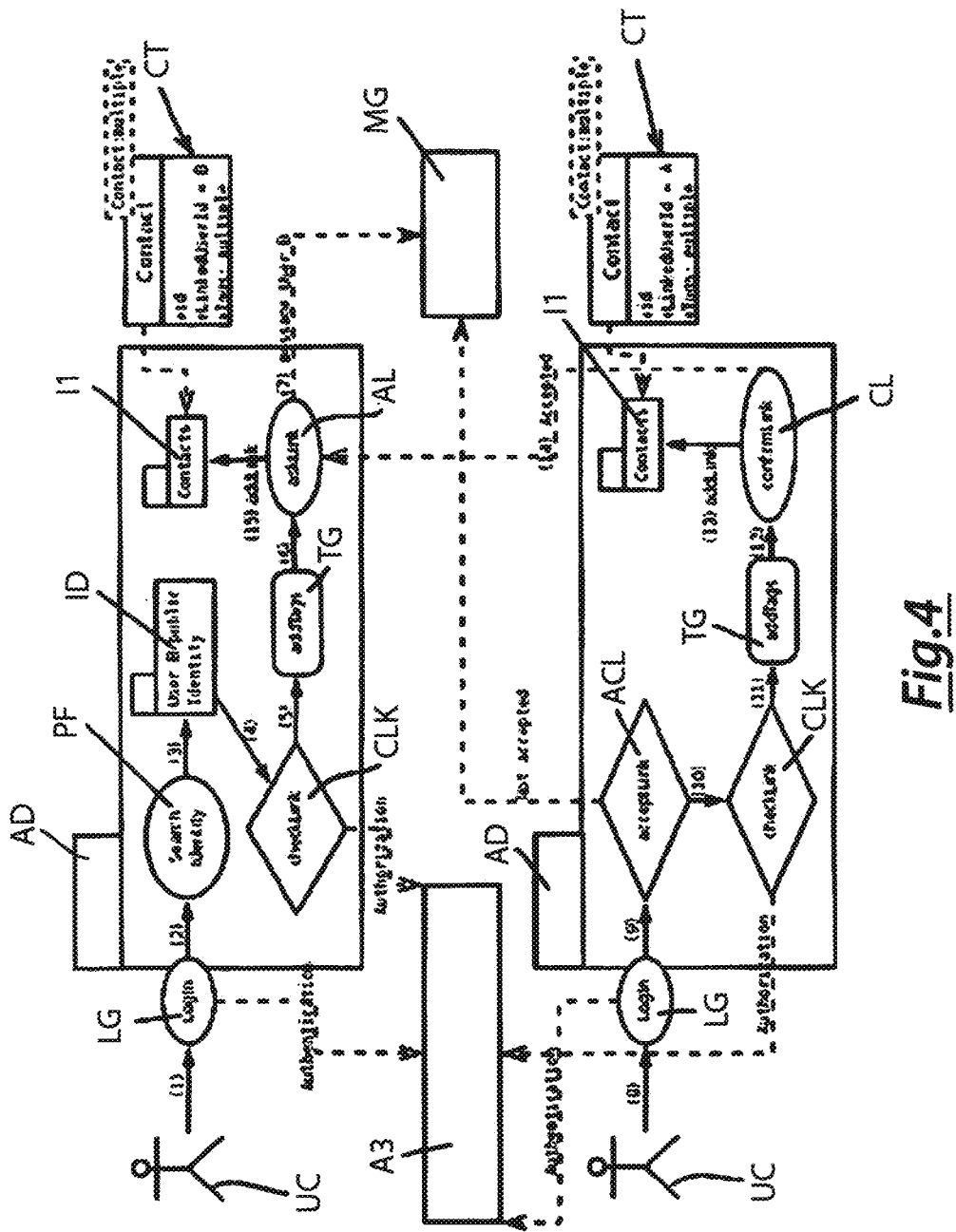
FIG. 4 shows a block diagram of a process of multiple users' interaction within the system for managing and sharing, according to the present invention.

The process shown in detail in the appended FIG. 4 defines how the users certified or registered UC interact each other.

The "Contact" CT blocks contains the data which allow to uniquely identify the relationship between two users UC, while individual users UC, after being authenticated through login LG, can associate some keywords or tags TG in order to better index (according to appropriate categories) their own data and within the blocks CT and automatically identify which profile ID (complete with tags TG) is desired to disclose towards that specific contact.

Replies CL to requests AL of authorization of viewing data, after an acceptance ACL and control CLK phase, can be positive or negative and depend on the limits set as tags TG in user's profile PF; thereafter, the user UC can modify only the attribute related to the tags TG.

A generic search function is also available in order to search for contacts and related data, such as telephone numbers, e-mail, fax, web, etc.; in this case, fully public business cards BV, which can be viewed on-line also by unregistered users UC, can be further available.

The registered user UC, through his own desktop, can view profiles and data of other users UC who make them available to him, modify his personal data, search the public profiles PF of other users, request contact to other registered users UC, have one or more contacts with web sites (for example, Social Network) addresses, e-mail addresses, telephone and/or mobile numbers, etc., import/export data from or to programs or devices (for example, in order to quickly fill in the registration and/or sale modules), send free or fee-paying messages to his contacts according to the selected channels (SMS, e-mail, SIP, etc.), receive messages directly on the web, add tags TG to his contacts, view the status and possibly add credit to his account, view the status and modify his profile PF (for instance, into a fee-paying one in order to extend his account limits).

The system can also have a module (of VCARD type) that imports and manages the local data saved by the various external devices; in this case, the system object of the invention asks the user UC if he wants to automatically send to the added local contacts some invitations to join the site which hosts the aforesaid system, differentiating them on the basis of already registered or not users UC and, if the imported contacts are already in the system, it starts the connection procedure among the users UC concerned, so as not to use the local connection system.

Finally, it is possible to use control mechanisms and/or tagging system (in case of emergency), default GP groups (family, friends, work, etc.), privacy policy with hereditariness, repository of local contacts (i.e. those ones which are not present and/or active on the site of the system), systems of automatic forwarding of the entry of added local contacts, automatic notification systems of the activation of a local contact and/or systems of authorization and management of connection requests, so to keep track of the number of active links.

The technical features of the system and related method for managing and sharing users' information and contacts within a computer network, according to the present invention, as well as the resulting benefits, are clear from the description made.

It is, finally, clear that many other variations can be made to the system and method for managing and sharing in question, without departing from the principle of novelty intrinsic in the inventive idea expressed here, as it is clear that, in the practical implementation of the invention, materials, shapes and sizes of the illustrated details can be changed, as needed, and replaced with others technically equivalent.

The invention claimed is:

1. System for managing and sharing users' information and contacts within a computer network, comprising a memory, a program software, implemented on a Internet (RI) web server (FE), which manages and filters users' (UC) requests and which is configured so as to keep free connections towards a database (AD) and connections on demand towards said users (UC), said database (AD) being also able to provide requested information and/or data on different interfaces and each user (UC) knowing his/her own relationships and relationships that are established with other users (UC), through access interfaces (I1, I2) which allow or not to carry out connections (C) for reading information and/or data contained within respective supports or cards (BV) which said users (UC) hold, said information and/or data contained in said supports or cards (BV) being modifiable by said users (UC), characterised in that said information and/or data contained in said supports or cards (BV) are different depending on keywords or tags (TG), which are associated by said users (UC) to said supports or cards (BV), and depending on relationships existing between users (UC), said tags (TG) being provided in order to make visible said supports or cards (BV) to one or more categories of individuals identifying one or more profiles (ID) which can be disclosed to one or more contacts (CT) wherein said users (UC) are registered on said web server (FE) and
- have access to information and/or data of other users (UC) who make them available,
- are able to modify their own personal data,
- are able to make searches of public profiles (PF) of other users (UC),
- are able to make contact requests to other registered users (UC),
- are able to have one or more contacts with website addresses, e-mail addresses, phone and/or mobile numbers,
- are able to carry in and/or send information and/or data to programs or devices,
- are able to send free or fee-paying messages to their own contacts (CT),
- are able to receive messages on the web,
- are able to add tags (TG) to their own contacts (CT),
- are able to control the status of their own account and to add credit to said account,
- are able to control the status of their own profile (PF) and to change said profile (PF).

2. System as claimed in claim 1, characterised in that not-registered users have access to information and/or data of supports or cards (BV) which are tagged by said users (UC) as public.

3. System for managing and sharing users' information and contacts within a computer network, comprising a memory, a program software, implemented on a Internet (RI) web server (FE), which manages and filters users' (UC) requests and which is configured so as to keep free connections towards a database (AD) and connections on demand towards said users (UC), said database (AD) being also able to provide requested information and/or data on different interfaces and each user (UC) knowing his/her own relationships and relationships that are established with other users (UC), through access interfaces (I1, I2) which allow or not to carry out connections (C) for reading information and/or data contained within respective supports or cards (BV) which said users (UC) hold, said information and/or data contained in said supports or cards (BV) being modifiable by said users (UC), characterised in that said information and/or data contained in said supports or cards (BV) are different depending on keywords or tags (TG), which are associated by said users (UC) to said supports or cards (BV), and depending on relationships existing between users (UC), said tags (TG) being provided in order to make visible said supports or cards (BV) to one or more categories of individuals identifying one or more profiles (ID) which can be disclosed to one or more contacts (CT) wherein said users (UC) are registered on said web server (FE) and have access to information and/or data of other users (UC) who make them available, are able to modify their own personal data, are able to make searches of public profiles (PF) of other users (UC), are able to make contact requests to other registered users (UC), are able to have one or more contacts with website addresses, e-mail addresses, phone and/or mobile numbers, are able to carry in and/or send information and/or data to programs or devices, are able to send free or fee-paying messages to their own contacts (CT), are able to receive messages on the web, are able to add tags (TG) to their own contacts (CT), are able to control the status of their own account and to add credit to said account, are able to control the status of their own profile (PF) and to change said profile (PF).

* * * * *